United States Patent [19]

Alexander, Sr.

[11] Patent Number: 4,928,446

[45] Date of Patent: May 29, 1990

[54] BREAK-AWAY SIGN POST AND POST GROUND ANCHOR

[76] Inventor: Walter A. Alexander, Sr., 1805 Roswell Rd., Apt. 19E, Marietta, Ga. 30062

[21] Appl. No.: 286,031

[22] Filed: Dec. 14, 1988

Related U.S. Application Data

[63] Continuation-in-part of Ser. No. 156,220, Feb. 16, 1988, which is a continuation-in-part of Ser. No. 123,709, Nov. 23, 1987.

[51] Int. Cl.⁵ .................... F16B 7/00; E02D 5/74
[52] U.S. Cl. ........................... 52/98; 52/155; 52/726; 403/2; 404/10
[58] Field of Search ............. 52/98, 155, 726; 404/9, 404/10; 256/13.1, 1; 403/2, 312; 285/3, 4

[56] References Cited

U.S. PATENT DOCUMENTS

| | | | |
|---|---|---|---|
| 3,349,531 | 10/1967 | Watson | 404/9 X |
| 3,521,917 | 7/1970 | King | 404/10 X |
| 3,606,222 | 9/1971 | Howard | 52/98 X |
| 3,628,296 | 12/1971 | Henry | 52/98 |
| 3,820,906 | 6/1974 | Katt | 404/10 X |
| 4,021,977 | 5/1977 | Deike | 52/98 |
| 4,105,350 | 8/1978 | O'Donnell | 52/98 X |
| 4,553,358 | 11/1985 | Dieke | 52/98 |
| 4,603,520 | 8/1986 | Dieke | 52/98 |
| 4,615,156 | 10/1986 | Deike | 52/98 |

FOREIGN PATENT DOCUMENTS 660060  3/1987  Switzerland ............. 52/98

*Primary Examiner*—James L. Ridgill, Jr.
*Attorney, Agent, or Firm*—Thomas & Kennedy

[57] ABSTRACT

A break-away post is disclosed that has two channel members mounted together in mutually spaced alignment by a stud that is scored in its mid-portion that spans the two spaced channels.

7 Claims, 4 Drawing Sheets

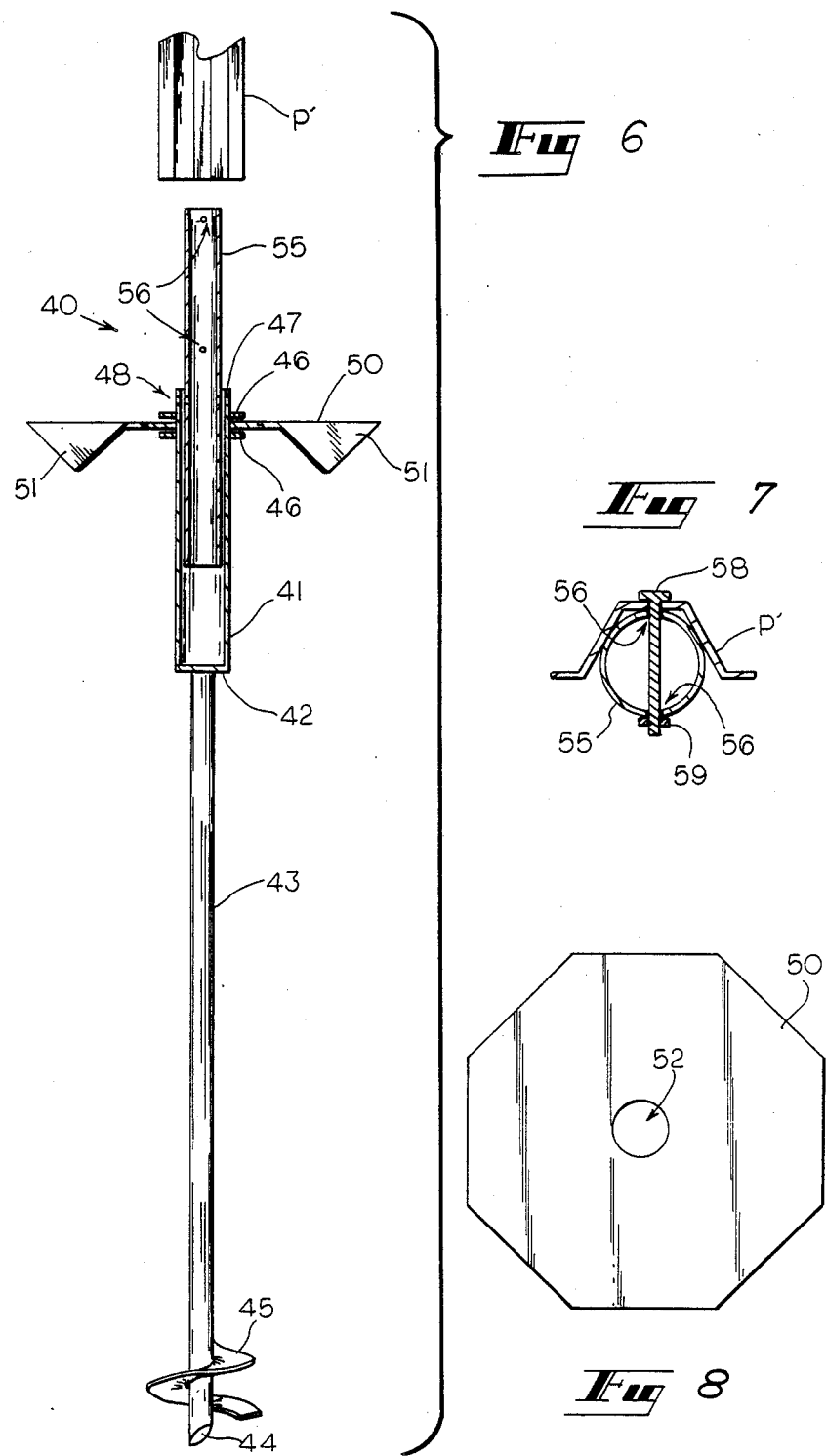

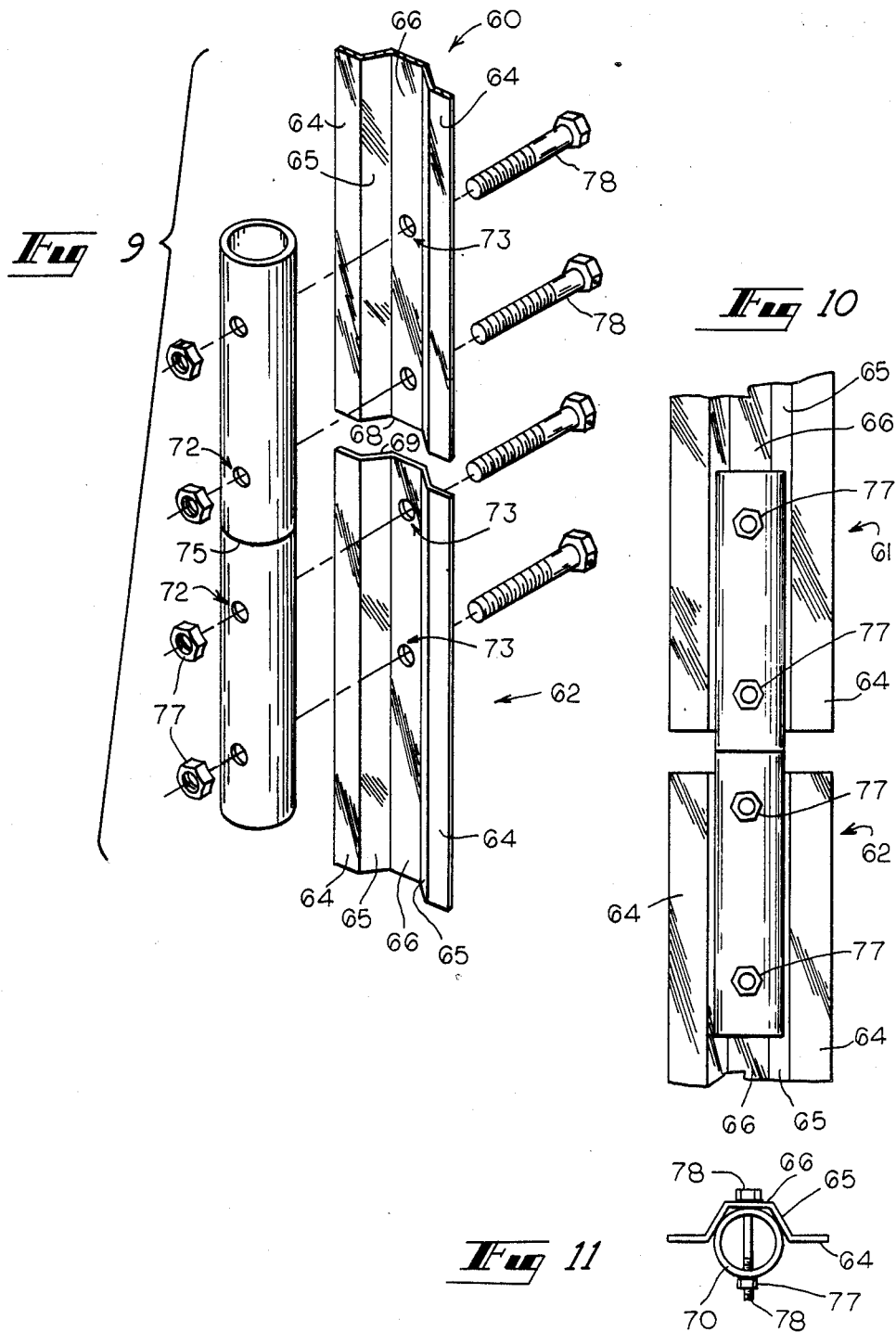

BREAK-AWAY SIGN POST AND POST GROUND ANCHOR

REFERENCE TO RELATED APPLICATION

This is a continuation-in-part of application Ser. No. 156,220 filed Feb. 16, 1988 which is a continuation-in-part of application Ser. No. 123,709 filed Nov. 23, 1987.

TECHNICAL FIELD

This invention relates to ground anchors for use in anchoring posts, poles and the like uprightly upon the ground, to methods of performing such operations, and to break-away type posts.

BACKGROUND OF THE INVENTION

Ground or earth anchors have heretofore been devised for use in anchoring structures firmly to the ground. Exemplary of such are those shown in U.S. Pat. Nos. 3,969,853, 4,280,768, 4,593,872 and 4,653,245. Break-away sign posts have also been devised. Examples of these are shown in U.S. Pat. Nos. 3,875,720, 3,958,349, 4,071,970, 4,126,403, 4,310,979 and 4,364,688. Some ground anchors are designed to be manually embedded into the soil while others are designed to be mechanically embedded by the use of power tools known as anchor drivers. The present invention is directed to a ground or earth anchor of these types for the support of posts uprightly upon the surface of the ground. The invention is also directed to posts of break-away type construction.

As shown in the just mentioned patents, those ground anchors that are used to support large structures have themselves had to be of relatively large, complex and rugged construction in order to accommodate the large forces necessary to embed the anchors deeply and to provide sufficient anchoring power once embedded. Conversely, ground anchors that have been devised for supporting smaller structures such as fence posts, guard rails, tent posts and the like have been relatively simple, lightweight and usually designed for manual installation. Heretofore, it has generally been thought that ground anchors for post have had to be of the manual embedding type to render them economically feasible. The problem most commonly associated with break-away posts has been that they are designed to break or swing away when impacted from a particular direction. In reality, such posts are often struck from other directions, particularly where they are not the first object struck in an accident.

The present invention has for a principal object the provision of a ground anchor for use in supporting posts uprightly upon the surface of the ground which is of relatively simple and economic construction and yet which is adapted to be readily installed. With its use the labor involved in digging post holes or in manually embedding an anchor may be reduced or even eliminated. Its use also eliminates the need for the use of concrete in forming an in situ anchor about the post and thus also serves to eliminate the waiting period for concrete to set in order to complete installation. The inventive break-away post is designed to break away equally well regardless of the direction from which a jolt is applied to it.

SUMMARY OF THE INVENTION

In one form of the invention a ground anchor for anchoring a post comprises a tubular sleeve adapted to be driven by rotary drive means and a spike that extends from one end of the sleeve. A bit is mounted adjacent the end of the spike that is located distally from the sleeve. An elongated prop is provided, one portion of which is sized to be inserted into the sleeve. The anchor also has fastening means for fastening the prop to the sleeve, and a stabilizing platform mounted about said sleeve.

In another form of the invention a method of anchoring a post uprightly upon the ground comprises the steps of driving a first elongated anchor member that has a relatively thin lower portion and a relatively thick tubular upper portion into the ground sufficiently to embed the thin lower portion completely and to embed the thick tubular upper portion partially. An elongated second anchor member is inserted partially into the thick tubular upper portion of the first anchor member and the first and second members fastened together. The post is mounted upon that portion of the second anchor member that protrudes out of the first second member thick tubular upper portion with the post axially spaced from the first anchor member.

In yet another form of the invention a break-away post comprises two elongated channels of generally U-shaped construction each of which has a web from which two side walls divergently extend. The post has a stud that has a tubular wall of a selected thickness and with a central portion of the stud having a wall thickness less than the selected thickness to provide an area of structural weakness. The post also has means for mounting the stud to the two channels with the channels aligned in mutually spaced relation and with the stud central portion located between two channels.

BRIEF DESCRIPTION OF THE DRAWING

FIG. 6 is a side elevational view of a ground anchor embodying principles of the invention in another form.

FIG. 7 is a transverse cross-sectional view of a portion of the anchor shown in FIG. 6 with a post shown mounted thereto.

FIG. 8 is a plan view of the platform member of the anchor shown in FIG. 6.

FIG. 9 is an exploded, disassembled perspective view of a break-away post that embodies principles of the invention in yet another form.

FIG. 10 is a rear elevational, assembled view of the post of FIG. 9.

FIG. 11 is a plan view of the ground anchor shown in FIG. 10.

DETAILED DESCRIPTION

Figure 1:
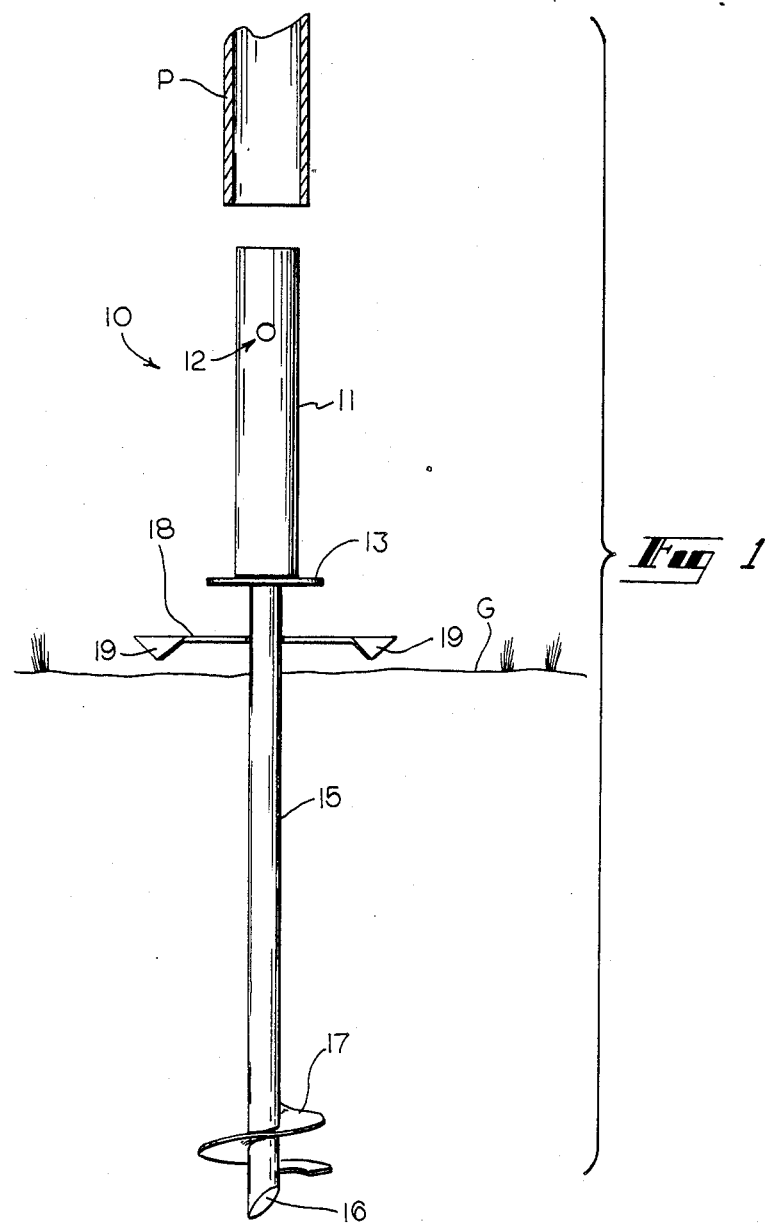
FIG. 1 is a side elevational view of a ground anchor embodying principles of the invention.
Figure 2:
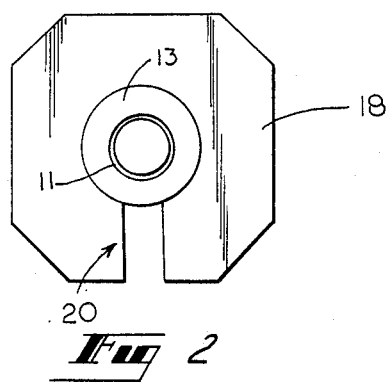
FIG. 2 is a plan view of the ground anchor illustrated in FIG. 1 shown together with a post or pole mounted thereon.

With reference next to FIGS. 1 and 2, there is shown a ground or earth anchor 10 which has a cylindrical, tubular support or prop 11 provided with a hole 12 in a side thereof to receive the pin of a conventional motorized anchor driver. A disc-shaped plate 13 is welded coaxially to the bottom of the tubular prop 11. A cylindrical spike 15 is in turn welded to the other side of the plate 13 so as to extend coaxially from the prop 11. The end of the spike located distally from the prop is formed with a beveled tip 16. A helical bit or auger fluke 17 is mounted to the spike adjacent the tip 16.

The ground anchor also includes a structurally independent platform 18 which, as can best be seen from FIG. 2, is in the form of a square plate. Each of the four corners of the plate are downturned to form four spade-like prongs 19. The plate is also formed with a slot 20 which extends from one of its sides to and somewhat past the plate center. This slot is sized to receive the spike 15 so that it maybe placed about it.

A hollow post or pole P may be mounted uprightly upon the surface of the ground G by means of the just described anchor in the following manner. In this case the post is of a tubular configuration, such as a conventional tennis fence post. The anchor tip is first forced into the ground with the anchor oriented uprightly so as to bring the bit into contact with the surface. An anchor driver is then coupled with the prop 11 by inserting its rotatable drive arm into the upper end of the prop and extending its locking pin laterally through the hole 12 to secure it to the prop. The anchor driver is then operated which causes the anchor to rotate. With some downward pressure applied, as by the weight of the driver, the helical bit 17 forces the spike 15 down into the ground as the prop and spike are rotated. This action is continued until the spike has been driven into the ground approximately to the position shown in FIG. 1.

Next the platform 18 is placed about the spike, as shown in FIG. 1, with its prongs 19 in contact with the ground. The anchor driver is further operated which causes the spike and prop to be driven further downwardly bringing the plate 13, which forms a step or shoulder at the junction of the prop and spike, into contact with the top of the platform 18. Further operation of the anchor driver causes the ground anchor to be driven still further downward thereby causing the prongs 19 of the platform, which is not being rotated, to become embedded in the surface of the ground and to bring the remainder of the platform into flush engagement with the surface of the ground G. The anchor driver is then uncoupled and removed from the prop leaving the anchor firmly embedded in the ground with its prop projecting upwardly therefrom and with the platform providing a high degree of stability positioned flushly atop the ground. The tubular fence post P is then telescoped upon the prop and brought to rest upon plate 13 with its inside positioned closely about the prop.

Figure 3:
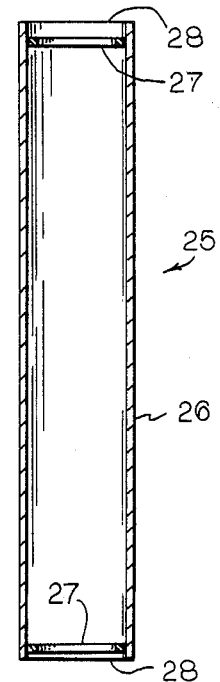
FIG. 3 is a cross-sectional view of an adapter for use with the ground anchor illustrated in FIG. 1.

A ground anchor of the same size as that just described may also be used to support a larger post or pole than post P by the use of the adapter shown in FIG. 3. The adapter 25 here is comprised of a cylindrical tube or pipe 26 which has a pair of rings 27 welded to its interior adjacent its ends 28. So constructed, the adapter 25 may be slid upon the prop 11 after the ground anchor has been embedded. A larger pipe may then be telescoped over the adapter to provide a close fit for stable ground support.

Figure 4:
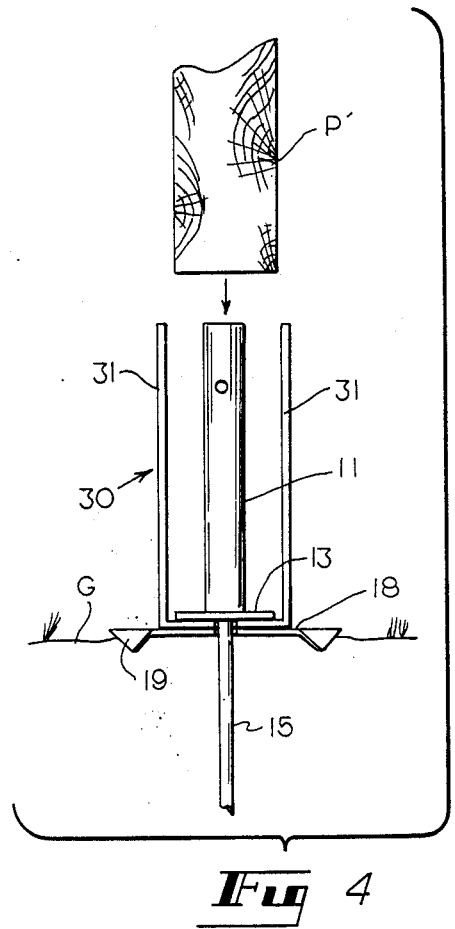
FIG. 4 is a side elevational view of the ground anchor illustrated in FIG. 1 together with another adapter shown mounted thereto.
Figure 5:
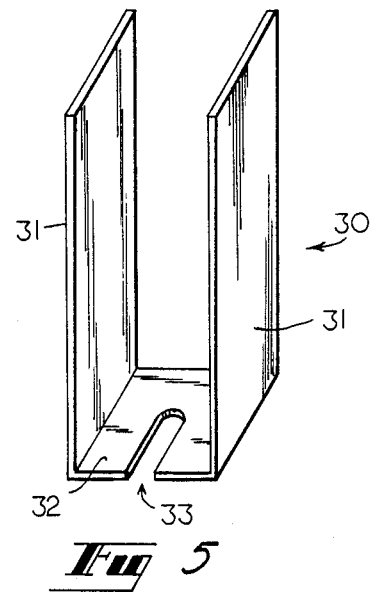
FIG. 5 is a perspective view of the adapter shown in FIG. 4.

The ground anchor illustrated in FIG. 1 may also be used to support square shaped rather than cylindrically shaped posts by the use of the other adapter 30 illustrated in FIGS. 4 and 5. This adapter is of U-shaped construction formed from a strip of metal that is bent into this shape to form two parallel leg portions 31 joined by a bight portion 32. The bight portion is formed with a slot 33 which is sized to receive the spike 15. In use, the adapter 30 is placed upon the platform 18 beneath the plate 13 just before the platform is finally driven into place upon the surface of the ground G, as shown in FIG. 4. With a channel having been drilled into the bottom of a wooden post P', the post is telescoped upon the prop 11 between the legs 31 of the adapter 30 thereby becoming mounted uprightly and secured upon the ground anchor and the ground.

With reference next to FIG. 6–8, there is shown a ground or earth anchor 40 in an alternative, "breakaway" configuration. It has a cylindrical, tubular sleeve 41 that is formed with a pair of closely spaced flanges 46 that project outwardly from the sleeve adjacent its upper, open end 47. The sleeve 41 has a pair of aligned holes 48 therethrough located between its open end 47 and the flanges 46.

The sleeve 41 also has an end wall 42 to which a cylindrical spike 43 is welded so as to extend coaxially from the sleeve 41. The end of the spike located distally from the sleeve is formed with a beveled tip 44. A helical bit or auger fluke 45 is mounted to the spike adjacent the tip.

The ground anchor 40 also has a platform 50 that is mounted loosely about the sleeve 41 between the two flanges 46. As in the previously described embodiment, the platform has its corners downturned to form four spade-like prongs 51. Here, however, the platform has no slot but rather has a central hole 52 through which the sleeve is extended during anchor fabrication.

The anchor 40 also includes a tubular prop or stud 55 that has an outside diameter smaller than the inside diameter of the sleeve 41 so that it may be inserted into the open end of the sleeve. It also has a pair of aligned holes which may be aligned with drive holes 48 in the sleeve, as shown in FIG. 6. The prop 55 has two additional pairs of mounting holes 56 which are shown located in that portion of the prop which is outside of the sleeve 41. These holes are provided for use in mounting a post P' with bolts 58 and nuts 59 firmly to the prop 55, as shown in FIG. 7. The post P' is a conventional U-shaped traffic sign post that has a set of vertically aligned mounting holes.

In use an anchor driver is coupled with the sleeve 41 by inserting its drive arm into the sleeve drive holes 48 with the prop 55 removed. The anchor driver is then operated with the spike tip 44 inserted into the ground which causes the sleeve and spike to rotate. As the sleeve rotates the platform will tend also to rotate slightly, but at a greatly reduced speed or rotation. Rotation of the sleeve and spike causes the bit 45 to drive the spike into the ground and then to drive the bottom of the sleeve also into it. Prongs 51 of the platform 50 are then brought into contact with the ground which serves to halt any rotary movement of the platform. Continued driving of the anchor forces the platform prongs 51 into the ground bringing the main body of the platform into position upon the ground surface.

The anchor driver is then inactivated and decoupled from the sleeve 41. Prop 55 is next inserted into the upper, open end of the sleeve bringing its unnumbered pair of holes into alignment with drive holes 48 of the sleeve. An unshown bolt is then passed through these holes and a nut threaded onto it thereby securing the prop to the sleeve. The bottom of the post P' is then placed against a side of the prop and secured thereto by a pair of bolts and nuts 58 and 59, as shown in FIG. 7, with the bottom end of the post elevated just above the top end 47 of the sleeve.

As previously stated, the ground anchor 40 is of "break-away" configuration. In other words, it is designed, constructed and installed so that a post anchored by it may be readily broken away from the anchor should it be accidentally struck, as by a vehicle, in order to minimize damage to the vehicle and injury to people. In such an event break-away will normally occur by the prop 55 being severed in the area of the lower of the two pairs of holes 56 where the post P' is fastened. This will usually result in no significant damage or shifting occurring to the embedded sleeve or spike so that a new anchor need not have to be supplied and embedded. Rather, only the remaining bottom portion of the severed prop need be removed and another prop mounted to the sleeve. The old post P, and sign may usually be then remounted.

With reference next to FIGS. 9-11, a break-away sign post 60 of another construction is shown which comprises upper and lower members 61 and 62. Each member is of a conventional generally U-shaped open flange channel construction. Specifically, the members, which are made of steel, have two coplanar flanges 64 unitarily joined by two flat side walls 65 that extend convergently to opposite sides of a flat web 65 that is oriented parallel with the two flanges. The lower member preferably is some 3 feet 4 inches in length while the upper member is typically about 10 feet in length. The upper and lower members of the post are mounted in alignment with their adjacent ends 68 and 69 spaced apart. By being mounted in alignment, the flanges, side walls and webs of the two members are seen to be substantially coplanar. A sign is normally mounted to the unshown upper end of the upper member, which is not shown here for conservation of drawing space.

The upper and lower post members 61 and 62 are mounted together by means of a preferably 12 inch long tubular steel stud 70. The stud is sized such that it may be placed in 3-point direct contact with the web and side walls of the upper and lower members, as best shown in FIG. 11. A 1.5 inch outside diameter stud accomplishes this. The stud is formed with 4 pairs of radially aligned holes 72 in its cylindrical wall. These holes are aligned with two holes 73 formed in each of the members 61 and 62, with the members spaced apart as shown. The stud also has an annular score 75 formed in a central portion of it midway between its ends, which renders it relatively weak at this point. A score depth of 37 mils in a 188 mil thick stud wall has been found to provide a good balance between having the post sufficiently sturdy, even under windy conditions with a road sign of standard size mounted on its top end, and yet sufficiently weak to break during accidental impact as by a motor vehicle.

The upper and lower members and stud are assembled by means of four sets of nuts 77 and bolts 78. The bolts are passed through the aligned holes in the members and stud and the nuts threaded tightly upon the exposed ends of the post's threaded shanks, as shown. Once assembled the stud score 75 is seen to be locate midway between the spaced ends of the upper and lower members. If desired the stud may be welded to the upper channel. Such a weld thus is herein considered as an equivalent to the upper set of nuts and bolts as a mounting means.

Assembly is preferably done after the lower member 62 has been driven into the ground, as with a sledge hammer, to a depth sufficient to provide sturdy anchoring for the type of soil encountered and with the top end of the lower member located sufficiently above the ground to enable assembly to be effected. A depth of 3 feet embedment is typical which leaves 4 inches of the channel protruding out of the ground.

In the event the upper member 61 of the sign post is accidentally struck, as by impact by a vehicle, the stud fractures along its weakened score line 75 and typically severs. As a result the upper member and sign mounted to it break away from the ground anchored lower member. This serves to reduce the damaging force that would otherwise be applied to the vehicle and to its passengers were the post not constructed with this break-away feature.

A very important benefit here is that break-away may occur equally well irregardless of the angle or direction of impact. That a 3-point elongated contact is made between the stud and the upper and lower members, enhances the rigidity and stability of the post under normal conditions. After separation a new, undamaged upper member may be easily remounted to the still embedded lower member with a new, intact stud.

It thus is seen that ground anchors and break-away posts of very simple and economic construction are provided which may be readily embedded in the ground for use. Though the posts or poles illustrated in the drawing have been telescoped about the anchor prop, it should be understood that the telescopic arrangement may be reversed with the posts being mounted inside of the prop. Though the prop has been shown to be cylindrical here, such is not essential. Nor is the use of the plate 13 since the bottom of the prop itself may provide a step or shoulder for the platform to abut. Thus, the plate essentially serves to widen the shoulder for enhanced stability and to facilitate welding of the spike to the prop during anchor manufacture. Though steel is preferred as the material for all of the anchor components, other metals could be used instead. And though the anchor is designed to be driven with a powered driver, it could be manually driven.

Thus, it should be understood that many modifications, additions and deletions may be made to the specific embodiments illustrated, other than those just expressly suggested, without departure from the spirit and scope of the invention as set forth in the following claims.

What is claimed:

1. A break-away post comprising two elongated channels of generally U-shaped construction each having a web from which two side walls divergently extend, a stud having a tubular wall of a selected thickness with an outside cylindrical surface sized to abut the inside surfaces of said two side walls and web of said channels and with a central portion of said stud having a tubular wall thickness less than said selected thickness to provide an area of structural weakness for allowing said stud to fracture omnidirectionally, and means for mounting said stud to said two channels with said channels aligned in mutually spaced relation, with said stud central portion located between said two channels and with said stud cylindrical outside surface abutting said two side walls and web of each of said channels.

2. The break-away post of claim 1 wherein said wall has an outside diameter selected to make contact with said web and two side walls of said channels.

3. The break-away post of claim 1 wherein said stud tubular wall is formed with at least one pair of radial aligned holes and at least one of said channels is formed with a hole, and wherein said mounting means comprises a threaded bolt sized to be extended through said stud hole and said channel hole and a nut sized to be threaded onto said bolt.

4. The break-away post of claim 1 wherein said stud is formed with at least two pairs of longitudinally spaced radially aligned holes to each side of said central portion, and wherein each of said channels is formed with a pair of holes that are located and longitudinally spaced to be aligned with said stud holes.

5. A break-away post comprising two elongated channels of generally U-shaped construction each having a flat web from which two flat side walls divergently extend, a stud having a tubular cylindrical wall of a selected thickness and with a central portion of said stud having a wall thickness less than said selected thickness to provide an area of structural weakness, first means for mounting said stud to one of said channels, second means for mounting said stud to said other channel with said channels aligned in mutually spaced relation and with said stud central portion located between said first and second mounting means.

6. The break-away post of claim 5 where said wall has an outside diameter selected to make contact with said web and two side walls of said channels.

7. The break-away post of claim 5 wherein at least one of said mounting means comprises a nut and bolt.

* * * * *